(12) United States Patent
Ferrando

(10) Patent No.: US 8,164,021 B1
(45) Date of Patent: Apr. 24, 2012

(54) ELECTRICALLY ASSISTED FRICTION STIR WELDING

(75) Inventor: William A. Ferrando, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1011 days.

(21) Appl. No.: 12/082,190

(22) Filed: Mar. 31, 2008

(51) Int. Cl.
*B23K 11/00* (2006.01)

(52) U.S. Cl. ............................ 219/78.13; 228/2.1

(58) Field of Classification Search ............ 219/50–67, 219/163, 164, 121.85; 228/112.1, 2.1, 2.3, 228/114; 148/415, 535, 621, 690, 559, 565; 428/544, 615; 403/271; 156/580
See application file for complete search history.

(56) References Cited

U.S. PATENT DOCUMENTS

| | | | | |
|---|---|---|---|---|
| 5,718,366 A * | 2/1998 | Colligan | | 228/112.1 |
| 5,829,664 A * | 11/1998 | Spinella et al. | | 228/112.1 |
| 6,360,937 B1 * | 3/2002 | De Koning | | 228/112.1 |
| 6,776,328 B2 | 8/2004 | Rice et al. | | |
| 6,793,118 B2 | 9/2004 | Palm | | |
| 6,866,181 B2 | 3/2005 | Aota et al. | | |
| 2002/0190100 A1 * | 12/2002 | Duncan, Jr. | | 228/112.1 |
| 2004/0035914 A1 * | 2/2004 | Hempstead | | 228/112.1 |
| 2004/0118899 A1 * | 6/2004 | Aota et al. | | 228/112.1 |
| 2006/0065698 A1 * | 3/2006 | Ishikawa et al. | | 228/112.1 |

* cited by examiner

*Primary Examiner* — Henry Yuen
*Assistant Examiner* — Thien S Tran
(74) *Attorney, Agent, or Firm* — Dave A. Ghatt

(57) ABSTRACT

An electrically assisted friction stir welding method and arrangement in which the required downward/pressing force typically exerted on a workpiece is substantially reduced. The method and apparatus involves the creation of a localized heated zone on a workpiece undergoing a welding operation. The localized heated zone is created using a resistive heating circuit running through the friction stir welding tool and the workpiece.

19 Claims, 5 Drawing Sheets

ELECTRICALLY ASSISTED FRICTION STIR WELDING

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a method and apparatus for friction stir welding, and in particular, an electrically assisted friction stir welding arrangement for welding workpieces by establishing a localized heated zone on the workpieces.

BACKGROUND

Welding is the preferred method of metal joining for most applications where permanent structural configuration is intended. The traditional weld mechanism of melting and initiating the pooling of a portion of each metal has undergone many changes. Since its inception, friction stir welding (FSW) has improved weld efficiency and physical properties of the product joint, among other advantages. Friction stir welding utilizes a rotating tip of appropriate material, which is forced against the butting edges of the weld pieces. The rotating tool produces heat by friction on the workpiece softening the material and mixing it simultaneously. The process does not normally require filler metals and can often be successfully applied without an inert gas cover.

The friction stir welding technique, however, despite its simplicity, has encountered a number of challenges. The relatively high downward/vertical force on the tool required to produce the heating required to initiate the weld virtually necessitates a large machine which renders it impractical to have portable or handheld friction stir welding devices. Recently, there have been developments in friction stir welding technology which have decreased the downward force requirements. These developments are focused on the supplementary heating of workpieces by various methods such as inductance heating, resistance heating, and laser heating. However, the supplementary heating is not typically limited to the immediate region of welding, and may adversely affect a larger region of the workpiece. Consequently, there is a need for a supplemental heating arrangement that localizes the heat transmitted to the workpiece. It is also desired to have a friction stir welding arrangement that reduces the downward/vertical force requirement by as much as 90% to improve the process and to enable the use of handheld/portable tools. Other limitations of conventional friction stir welding include low weld speed and significant tool wear. Accordingly, it is desired to have a friction stir welding apparatus and method that increases the weld speed and reduces the wear on the tool.

SUMMARY

In one aspect, the invention is an electrically assisted friction stir welding apparatus for reducing required downward forces on a workpiece during friction stir welding. In this aspect, the apparatus includes a tool having a casing, a pin for contacting the workpiece, with the pin extending through the casing. The pin is mounted for axial rotation with respect to the tool. The apparatus also includes a motor for rotating the pin. In this aspect, the invention includes a resistive heating circuit for heating the pin and for creating a localized heated zone on the workpiece. The resistive heating circuit has a power source, a positive junction connected to the casing, and a negative return junction defining the localized heated zone.

In another aspect, the invention is an electrically assisted friction stir welding arrangement for reducing the required downward forces on a workpiece. The arrangement includes a workpiece and a vertically adjustable tool having a rotatable pin having a top portion and a bottom portion for contacting the workpiece. A workpiece table for supporting the workpiece below the pin is provided. In this aspect, the invention further includes a resistive heating circuit for heating the rotatable pin and for creating a localized heated zone on the workpiece. The resistive heating circuit includes a power source, a positive junction connected to the top portion of the pin, and a negative return junction defining the localized heated zone. The negative return junction has a first contact positioned on the workpiece, and a second contact positioned on the workpiece, wherein when the pin contacts the workpiece, the pin is substantially halfway between the first contact and the second contact.

In another aspect, the invention is an electrically assisted friction stir welding method for reducing vertical force requirements. The method includes the providing of a friction stir welding tool having a rotatable pin, and the providing of a workpiece. According to the method, a resistive heating circuit is also provided, the circuit having an independent power source attached to the rotatable pin of the friction stir welding tool at a first junction. In the circuit, the power source is attached to the workpiece at a second junction, wherein the second junction includes first and second contacts. The method further includes the creating of a localized heated zone on the workpiece by switching on the independent power supply and by moving the rotatable pin into contact with the workpiece. According to the method, the localized heated zone is substantially between the first and second contacts. The method further includes the rotating of the rotatable pin, and the advancing of the rotating pin across the surface of the workpiece to weld the workpiece.

BRIEF DESCRIPTION OF THE DRAWINGS

Other features will be apparent from the description, the drawings, and the claims.

DETAILED DESCRIPTION

Figure 1A:
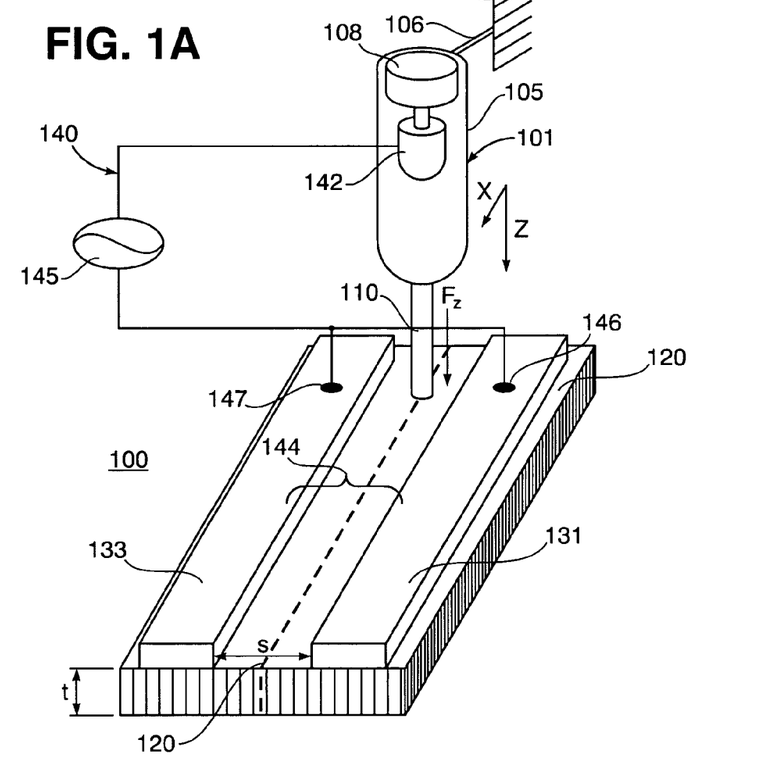
FIG. 1A is an exemplary schematic illustration of an electrically assisted friction stir welding arrangement according to an embodiment of the invention.

FIG. 1A is an exemplary schematic illustration of an electrically assisted friction stir welding arrangement 100 according to an embodiment of the invention. The arrangement 100 includes a stir friction tool 101, which as schematically illustrated, includes a casing 105 and a pin 110, extending through the casing. The pin 110 is rotatably mounted in the casing 105 for rotation in direction I. The tool 101 also includes a motor 108 for rotating the pin 110 at about 750 rpm to about 1500 rpm. As shown, the stir friction tool 101 is mounted to a fixed structure 104 via a connecting member 106. Although shown as a single element, the connecting member 106 may be made of a plurality of linking elements, such as pivotable arms and the like. The connecting member 106 allows for the movement of the tool 101 in the vertical direction Z. In operation, the tool 101 moves downwards and the rotating pin 110 contacts a workpiece 120 to perform the welding operation. The workpiece 120 may be a single metallic sheet, or may be two pieces of metal butted together along dotted lines 122, in which case the friction stir welding process joins the pieces together. The workpiece 120 may have a thickness t of about 0.125 in to about 0.75 in, and may be a material such as aluminum, steel, bronze, copper/steel, titanium, or the like.

The arrangement 100 further includes a resistive heating circuit 140, for providing supplemental heat by establishing a localized heated zone on the workpiece 120. The resistive heating circuit 140 includes the tool 101, the workpiece 120, and also a power source 145, which is an A.C. source, but may also be a D.C. source. As shown in FIG. 1A, the power source 145 is connected to the tool 101 at a positive junction 142. The junction 142 may be a slip commutation ring attached to an upper portion of the pin 110, through the casing 105. The power source is also connected to the workpiece 120 at a negative return junction 144. As shown, the negative return junction 144 includes first and second elongated contact strips 131 and 133, which are mounted on top of the workpiece 120. As shown, the elongated strips 131 and 133 are positioned parallel to each other, and parallel to the travel direction X of the pin 110. The strips 131 and 133 are connected to the power source at 146 and 147 as shown. Although illustrated as being mounted on top of the workpiece 120, the elongated strips 131 and 133 may alternatively be mounted underneath the workpiece 120, particularly in situations involving thicker workpieces. The strips may comprise a conductive metal such as copper or the like.

The resistive circuit 140 provides supplemental heating and as will be outlined below, creates a localized heated zone on the workpiece 120, which results in a substantially reduced downward (Fz-force) requirement during friction stir welding processes. In operation, after the power source 145 is turned on, the resistive heating circuit 140 is completed when the pin 110 is moved vertically down in direction Z and contacts the workpiece 120. A current of about 450 amps to about 650 amps may be used. However, some applications may require current values in the order of several thousand amps. The closed circuit is maintained as the pin 110 travels along the surface of the workpiece in a substantially horizontal direction X. Because of the arrangement in which the elongated contact strips 131 and 133 are set parallel to travel direction X, on either side of the pin, the return current follows the pin 110 as the pin travels between the strips 131 and 133. As outlined below, the elongated contact strips 131 and 133 are positioned to create the localized heated zone, thereby maximizing the supplemental heating of the workpiece 120

Figure 1B:
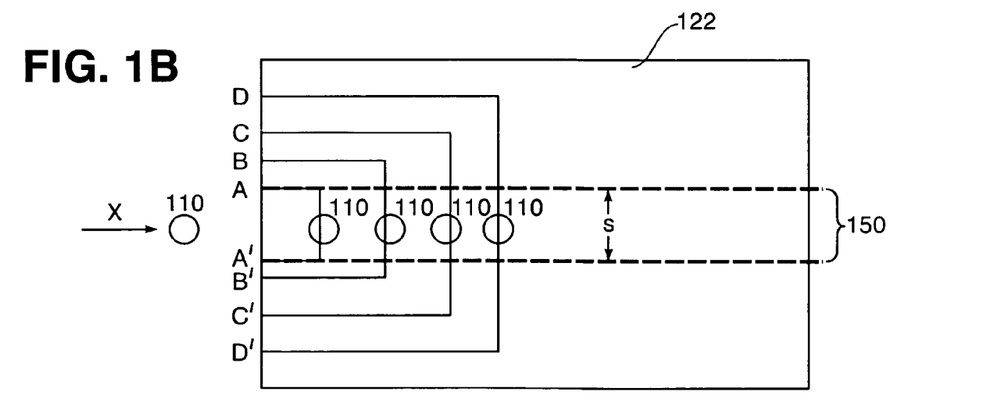
FIG. 1B is an exemplary schematic illustration of the effect of return contact position on resistive heat distribution, according to an embodiment of the invention.

FIG. 1B is a schematic illustration showing the effect of the return contact position on resistive heat distribution. FIG. 1B shows a workpiece 120, and pin 110 as the pin advances in the working direction X along the workpiece. FIG. 1B also shows various placements of the current return circuit strip pairs, AA', BB', CC', and DD'. Each current return circuit pair represents a possible location for the elongated strip pair 131 and 133 shown in FIG. 1A. In order to determine the optimum positioning for the strips the resistive characteristics of planar homogenous surfaces must be considered. In particular, the resistance of any square portion of material is equal to that of any other square portion, regardless of the size of the square portion. Thus, the resistance of a square inch and that of a square foot are equal. FIG. 1B shows representative squares of various sizes, depending upon the return strip placement. The direct ohmic heating of the workpiece $I^2R_{workpiece}$ is distributed throughout the total resistance area between the traveling tip and the return current strips. In view of the resistance distribution per square portion as outlined, the workpiece 120 will be subject to essentially identical total heat input from a given current, regardless of where the strips are located, i.e., AA', BB', CC', or DD'. Consequently, maximizing the heating of the material in the weld/pin vicinity requires the conductor to remain close to the moving tip all along the weld path.

Referring to FIG. 1B, the strip pair arrangement AA' is closest to the moving tip, and would therefore maximize the heating of the workpiece 120. The positioning of the AA' for maximized heating should correspond to the positioning of elongated strips 131 and 133 shown in FIG. 1A. In operation, the resistive heating circuit 140 supplementally heats the workpiece 120 in two ways. First, the circuit heats the pin 110, which in turn transmits the heat to the workpiece 120. Second, the circuit 140 provides heat to the workpiece 120, via the strips 131 and 133. The heating of the workpiece 120 via the heated traveling pin 110 and from the strip pairs AA' creates a localized heated zone 150, as shown in FIG. 1B between the dotted lines. The localized heated zone 150 lies along the weld path and is defined by the strips AA'. With respect to FIG. 1A, the localized heated zone lies in the channel-like area between the elongated strips 131 and 133. In one embodiment the distance S between the strips 131 and 133 is about 0.5 in to about 2.0 in, with the pin 110 substantially halfway between the strips. Thus, according to this embodiment, the pin 110 is about 0.25 inch to about 1.0 inch from each of the strips 131 and 133. Another advantage of the substantially narrow localized heated zone is the avoidance of the tempering of the workpiece due to the application of supplemental heat to widespread areas of the workpiece.

Figure 2:
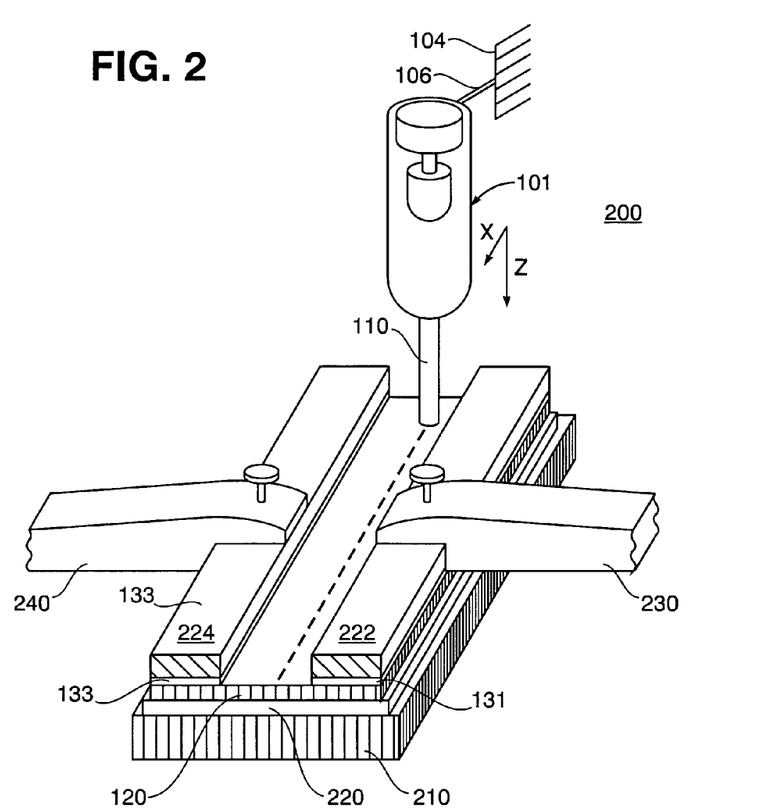
FIG. 2 is an exemplary schematic illustration of an electrically assisted friction stir welding arrangement including insulation, according to an embodiment of the invention.

FIG. 2 is an exemplary schematic illustration of an electrically assisted friction stir welding arrangement 200 including insulation, according to an embodiment of the invention. The arrangement 200 is similar to that of arrangement 100 of FIG. 1A. However, FIG. 2 illustrates an overall arrangement including a workpiece table 210, insulation strips 220, 222, and 224, and clamping devices 230 and 240.

As shown, the workpiece 120 is supported on the table 210, with an insulation strip 220 sandwiched between the workpiece 120 and the table 210. As outlined above, the workpiece may be a single metallic sheet, or may be two pieces of metal butted together. FIG. 2 also shows elongated contact strips 131 and 133 positioned on top of the workpiece 120. FIG. 2 further shows insulating plates 222 and 224 positioned on top of strips 131 and 133, respectively. Clamps 230 and 240 are used to maintain the arrangement during operation. Insulation strip 222 is sandwiched between clamp 230 and contact strip 130. Insulation strip 224 is sandwiched between clamp 240 and contact strip 133. The insulation strips 220, 222, and 224 may be made of insulating material such as mica or the like. During welding operations, the tool 101 moves in a working direction X, substantially parallel to the elongated length of strips 222 and 224, along the surface of the workpiece 120. To accommodate this motion, the table 210 may be movably mounted with respect to the tool 101. Alternatively, the tool 101 may be movably mounted with respect to the table 210. Alternatively, both the tool 101 and the table 210 may be movably mounted with respect to each other.

Figure 3:
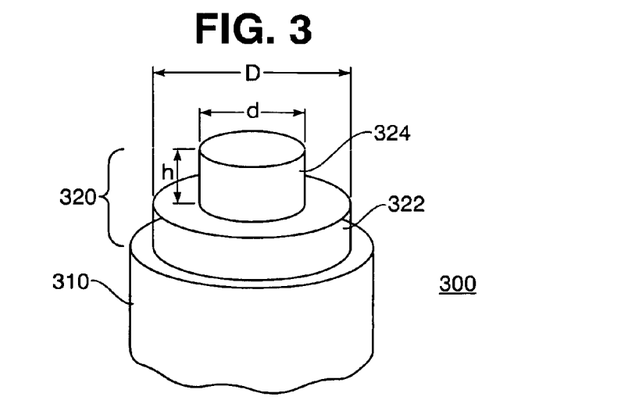
FIG. 3 is an exemplary schematic illustration of a pin according to an embodiment of the invention.

FIG. 3 is an exemplary schematic illustration of a pin head 300 of a pin 110 for tool 101, according to an embodiment of the invention. The pin head 300 may be used in the arrangements of FIGS. 1A and 2. As shown in FIG. 3, the pin 300 includes a supporting collar 310. The pin also includes a two-part tip 320 having a first part 322 having a first diameter D, and a second part 324 at the end of the pin for initially contacting the workpiece, having a diameter d, which is smaller than diameter D. Diameter D may be about 0.25 inches to about 0.75 inches. Diameter d may be about 25% to about 75% of diameter D. As shown, the second part 324 has a height h, which may be about 0.125 inches. The two-part tip 320 is used to machine workpieces. The two-part tip 320 may be made from materials such as, cubic boron nitride, molybdenum, steel, tantalum, tungsten rhenium, tungsten carbide, titanium carbide, or silicon carbide.

The electrically assisted friction stir welding arrangements outlined above, which creates a localized heated zone on workpieces, significantly reduces the amount of downward pressing force (Fz-force) required during friction stir welding operations. In one particular embodiment for an arrangement 200 as shown in FIG. 2, a stainless steel pin 300 may have a diameter D, of about 0.375 inches, with diameter d being about 25% to about 75% of diameter D. In this particular embodiment, the motor drives the pin at about 1300 rpm, performing stir friction welding. A current of about 300 Amps may be used, and the workpiece may be an AL 5083 plate of about 0.125 inches thickness. In this embodiment the downward force Fz-force is about 90 lbs. Typically, without the resistive heating circuit creating a localized heated zone, the Fz-force requirement would be about 1000 lbs. Therefore, by using the disclosed arrangement, only about 9% of the conventionally required Fz-force produced the desired weld. Generally speaking, a proper combination of variables, electrical assisted stir friction welds can be produced in aluminum with an applied Fz-force in the order of 100 lbs, which is about 10% of what is conventionally required.

The above outlined examples related generally to an aluminum workpiece. However, substantial Fz-force requirement reductions are also possible in examples involving workpieces of other materials, such as steel, bronze, copper/steel, or titanium. To obtain good results, parameters such as pin diameter, pin material, current strength, and rpm, for example may be adjusted. For example, steel workpieces require a more demanding welding environment. Thus, the pin may preferably be made from more robust materials such as cubic boron nitride, molybdenum, tungsten rhenium, or tantalum. Additionally, current values, rpm values, and pin dimensions may be manipulated to meet the requirements of the system.

Figure 4:
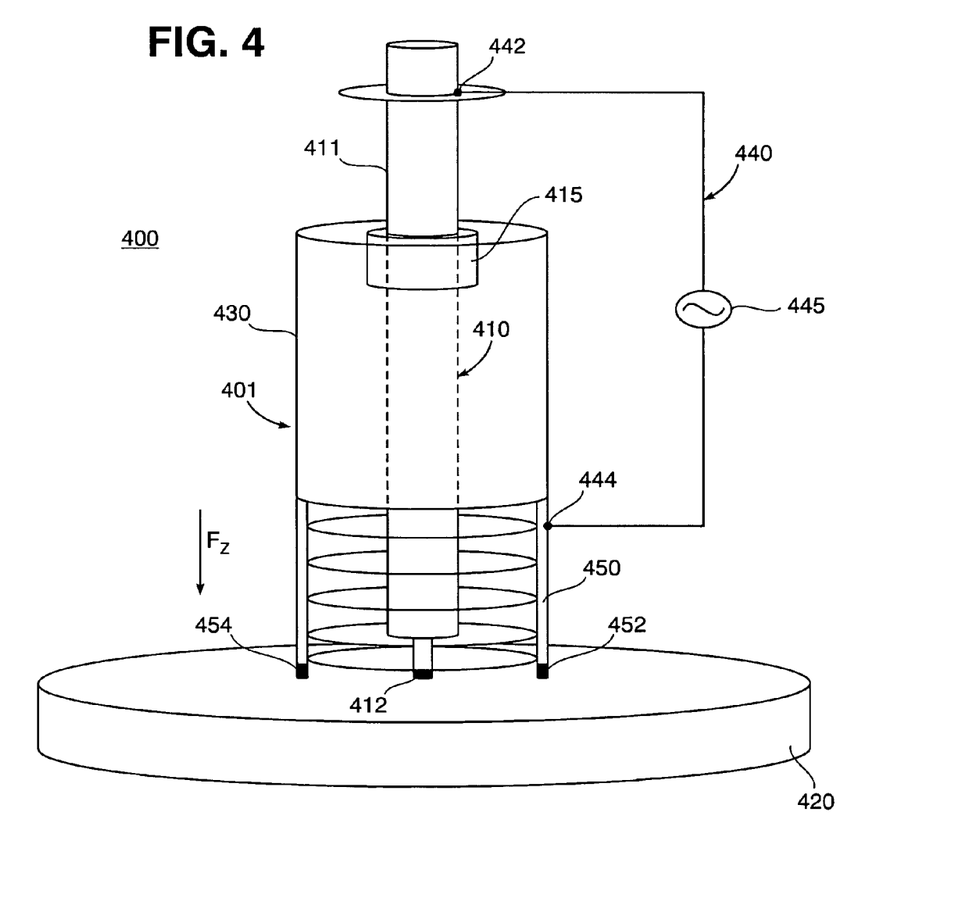
FIG. 4 is an exemplary schematic illustration of a portable electrically assisted friction stir welding clamped arrangement according to an embodiment of the invention.

FIG. 4 is an exemplary schematic illustration of a portable/handheld electrically assisted friction stir welding arrangement 400 according to an embodiment of the invention. Similar to the arrangements of FIGS. 1A and 2, the portable arrangement 400 produces localized heated zones on workpieces, thereby reducing the Fz-force requirement by as much as about 90%. The significant reduction in Z-force requirement allows the use of a portable or handheld device.

FIG. 4 shows the portable tool 401 having a pin 410, the pin having an upper portion 411 and a lower working portion 412, which contacts workpiece 420. FIG. 4 further shows a casing 430, through which the pin 410 extends, and a motor 415 within the casing 430 for rotating the pin 410. A cylindrical spring arrangement 450 is attached to a bottom shoulder portion of the casing 430. The cylindrical spring arrangement 450 surrounds the lower working portion 412 of the pin 410. The cylindrical spring also extends from the casing 430 to the workpiece 420, thereby supporting the tool 401 on the workpiece. The cylindrical spring contacts the workpiece 420 at two separate points, 452 and 454 as shown.

The arrangement 400 further includes a resistive heating circuit 440, which is powered by a power source 445. The power source 445 is an A.C., source, but may also be a D.C. source. In the resistive heating circuit 440, the power source 445 is connected to the tool at junction 442 at the upper portion 411 of the pin, and also at the junction 444. The power source is connected to the workpiece 420 via a negative return junction at spring contacts 452 and 454. The contacts 452 and 454 are located on opposite sides of the lower pin portion 412, and each contact may be about 0.25 inches to about 1.0 inch away from the pin 410 at the point where the pin contacts the workpiece 420. As will be outlined below, as the tool 401 moves across the workpiece, the contacts 452 and 454 maintain sliding contact with the workpiece.

In operation, the electrically assisted friction stir welding arrangement 400 works in a similar manner to the arrangements outlined in FIGS. 1A and 2. Electrical energy from the resistive heating circuit 440 heats the workpiece via the lower pin portion 412 and via the contacts 452 and 454. As the tool 401 is manipulated across the workpiece surface, the resistive heating circuit is maintained because both the pin 410 and the contacts 452 and 454 maintain contact with the workpiece. The resistive heating circuit therefore creates a localized heated zone on the workpiece in the region between contacts 452 and 454. The heat created in the localized heated zone softens the workpiece 420 to the extent that a substantially reduced Fz-force is required to weld the workpiece. It should be noted that pin materials, pin diameters, current values, rpm values, workpiece materials, and other parameters outlined with respect to FIGS. 1-3, are also applicable in the portable arrangement 400.

Figure 5:
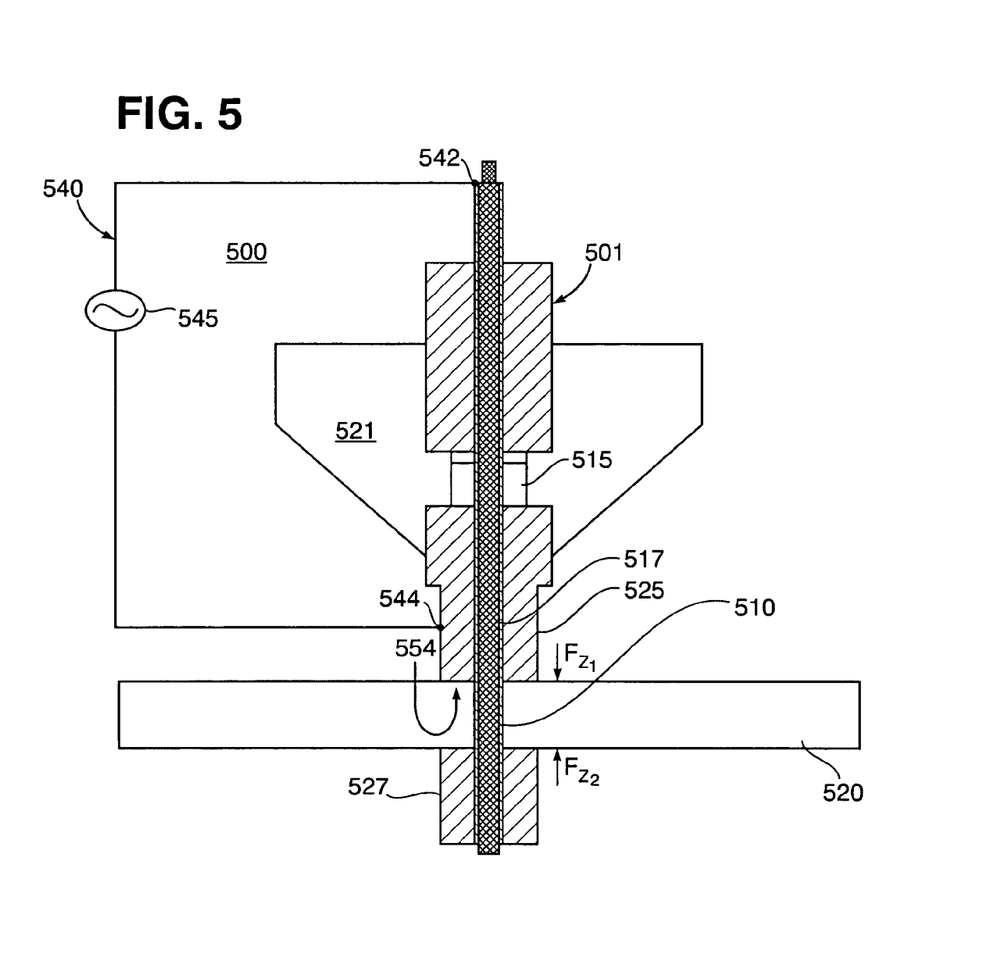
FIG. 5 is an exemplary schematic illustration of an electrically assisted friction stir welding arrangement according to an embodiment of the invention.

FIG. 5 is an exemplary schematic illustration of an electrically assisted friction stir welding clamped arrangement 500, according to an embodiment of the invention. The arrangement 500 includes an adjustable pin tool 501, which also produces localized heated zones on workpieces, thereby reducing the downward force $Fz_1$-force and $Fz_2$-force, which in arrangement 500 is essentially the clamping force. Similar to the arrangements of FIGS. 1A and 2, the tool 501 may be anchored to a fixed structure.

As shown in FIG. 5, the tool 501 includes a casing 521 and a pin 510, which extends through the casing and through a workpiece 520. The tool 501 also includes a motor 515 for rotating the pin 510. FIG. 5 shows insulation 517 which insulates the pin 510 from the body of the tool. The casing 521 includes an upper shoulder 525 and a lower shoulder 527, the upper and lower shoulders attached to upper and lower surfaces respectively, of the workpiece 520, for clamping the tool 501 to the workpiece. As stated above, the workpiece 520 may be a single metallic sheet, or may be two pieces of metal butted together. In the clamping arrangement operation involving a single sheet workpiece, a hole may be drilled through the workpiece 520, and the pin 510 subsequently threaded through the drilled hole. In a workpiece arrangement in which two sheets are butted together, the pin may be positioned in the slot between two sheets. With the pin 510 in the threaded hole or in the slot, the tool 501 is then clamped via the upper and lower shoulders 525 and 527 to the workpiece 520.

FIG. 5 further shows the resistive heating circuit 540 having a power source 545, the circuit including the tool 501 and the workpiece 520. As shown, the power source 545 is attached to the pin 510 at a first junction 542. The power source 545 is attached to the tool body at a second junction 544. FIG. 5 shows negative return junction 554, at which point the current flowing through the body of the tool 501 returns to the pin, via the workpiece 520. The flow of current through the pin 520 is isolated from the flow of current through the body of the tool 501 by means of the insulation 517. Thus, the circuit is only completed when current flowing at the upper shoulder 525 is dissipated into the workpiece 520, at 554, and returns to the tool via the pin 510. This resistive heated arrangement 500 creates a localized heated zone on the workpiece 520 in the vicinity of 554, due to the heated pin and also because of the current flowing from the upper shoulder 525 into the workpiece. It should be noted that the negative return junction 554 may involve a plurality of contact points as a plurality of contact points on the upper shoulder 525 may contact the workpiece to supply the return current to the pin. This supplemental heating reduces traditionally required clamping forces.

Figure 6:
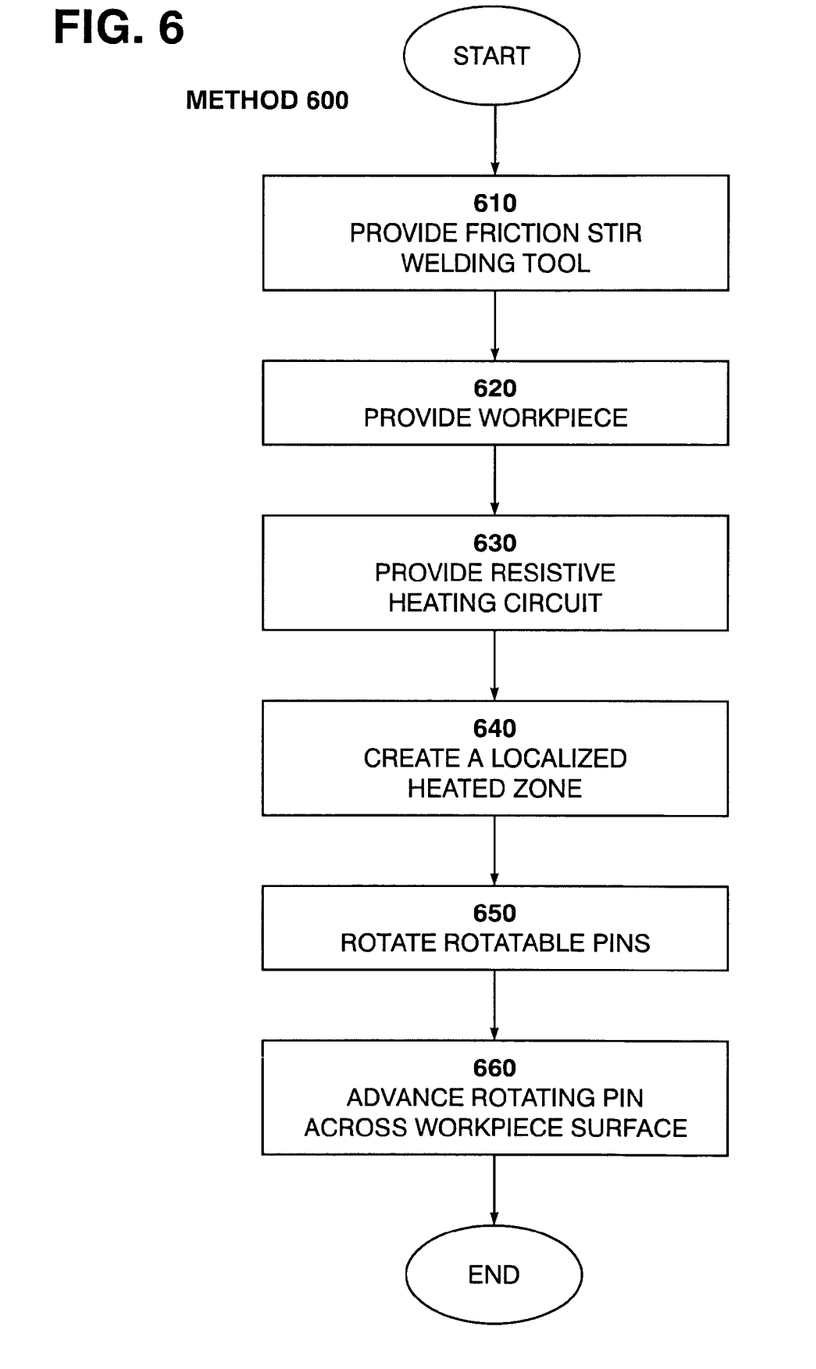
FIG. 6 is a flowchart illustrating a method of friction stir welding according to an embodiment of the invention.

FIG. 6 is a flowchart illustrating a method 600 of friction stir welding according to an embodiment of the invention. The steps involved in the method 600 of friction stir welding have been outlined above in detail in the description with respect to FIGS. 1A-4. Step 610 is the providing of a friction stir welding tool having a rotatable pin. The friction stir welding tool may be an anchored to a fixed structure as shown in FIGS. 1A and 2. Alternatively, the friction stir welding tool may be a portable/handheld device as shown in FIG. 4. Step 620 is the providing of a workpiece. The workpiece may be a single metallic sheet, or may be two pieces of metal butted together. The workpiece may have a thickness of about 0.125 inches to about 0.75 inches, and may be a material such as aluminum, steel, bronze, copper/steel, titanium, or the like.

Step 630 is providing of a resistive heating circuit. The resistive heating circuit includes an independent power source attached to the rotatable pin of the friction stir welding tool at a first junction. The power source is attached to the workpiece at a second junction, wherein the second junction includes first and second contacts. The first and second contacts may be fixed plates as shown in FIGS. 1A and 2, or may be slidable contacts as shown in FIG. 4. Step 640 is the creating of a localized heated zone on the workpiece by switching on the independent power supply and by moving the rotatable pin into contact with the workpiece to close the circuit. The localized heated zone is substantially between the first and second contacts.

Step 650 is the rotating of the rotatable pin, which is powered by motor associated with the tool. Step 660 is the advancing of the rotating pin across the surface of the workpiece to weld the workpiece. As outlined above, the workpiece may be a single metallic sheet, in which case the welding is performed to mechanically alter a surface of the workpiece. Alternatively, the workpiece may be a couple of metallic sheets butted together, in which case the welding may be performed to join the two sheets into a single structure.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. An electrically assisted friction stir welding apparatus for reducing required downward forces on a workpiece during friction stir welding, the apparatus comprising:
 a tool comprising:
  a casing;
  a pin for contacting said workpiece, the pin extending through the casing, and mounted for axial rotation with respect to the tool;
  a motor for rotating the pin;
 a resistive heating circuit for heating the pin and for creating a localized heated zone on said workpiece, the resistive heating circuit comprising:
  a power source;
  a positive junction connected to the casing; and
  a negative return junction defining the localized heated zone, wherein the negative return junction comprises:
   a first electrical contact positioned on said workpiece; and
   a second electrical contact positioned on said workpiece, wherein when the pin contacts said workpiece, the pin is substantially halfway between the first electrical contact and the second electrical contact, wherein in the negative return junction, the first electrical contact comprises a first elongated plate, the second electrical contact comprises a second elongated plate, the first elongated plate and the second elongated plate positioned on said workpiece.

2. The apparatus of claim 1, further comprising: a workpiece table for supporting said workpiece below the pin when the pin contacts the workpiece, wherein the workpiece table is mounted to be displaceable with respect to the pin in a working horizontal direction, and wherein, the first elongated pin and the second elongated plate are positioned on said workpiece in an orientation in which the first elongated plate and the second elongated plate are parallel to each other and parallel to said working horizontal direction.

3. The apparatus of claim 2, further comprising:
 a first clamping device and a second clamping device for holding said workpiece and the first and second elongated plates on the workpiece table; and
 an insulating arrangement, the insulating arrangement comprising:
  a first insulation pad sandwiched between the first elongated plate and the first clamping device;
  a second insulation pad sandwiched between the second elongated plate and the second clamping device; and
  a third insulation pad sandwiched between the workpiece table and said workpiece.

4. The apparatus of claim 2, wherein the pin comprises one of Molybdenum, steel, Cubic Boron Nitride, Tungsten Carbide, Titanium Carbide, or Silicon Carbide, and wherein each of the first elongated plate and the second elongated plate comprise copper, and wherein when the pin contacts said workpiece, the distance between the tip and each of the first and second contacts is about 0.25 inch to about 1.0 inch.

5. The apparatus of claim 4, wherein the pin comprises a two-part tip comprising:
 a first part having a first diameter; and
 a second part for initially contacting said workpiece, the second part having a second diameter, wherein the second diameter is about 25% to about 75% of the first diameter.

6. An electrically assisted friction stir welding apparatus for reducing required downward forces on a workpiece during friction stir welding, the apparatus comprising:

a tool comprising:
  a casing;
  a pin for contacting said workpiece, the pin extending through the casing, and mounted for axial rotation with respect to the tool;
  a motor for rotating the pin;
a resistive heating circuit for heating the pin and for creating a localized heated zone on said workpiece, the resistive heating circuit comprising:
  a power source;
  a positive junction connected to the casing; and
  a negative return junction defining the localized heated zone, wherein the negative return junction comprises:
    a first electrical contact positioned on said workpiece; and
    a second electrical contact positioned on said workpiece, wherein when the pin contacts said workpiece, the pin is substantially halfway between the first electrical contact and the second electrical contact, wherein the tool is portable and entirely movable by a user, and wherein the casing includes a lower shoulder, the apparatus further comprising a cylindrical spring attached to the lower shoulder of the casing, the cylindrical spring arrangement surrounding a bottom portion of the pin, the cylindrical spring further comprising a first slidable end and a second slidable end, wherein the first slidable end is the first contact of the negative return junction and the second slidable end is the second contact of the negative return junction.

7. The apparatus of claim 6, wherein the pin comprises one of Molybdenum, steel, Cubic Boron Nitride, Tungsten Carbide, Titanium Carbide, or Silicon Carbide.

8. An electrically assisted friction stir welding apparatus for reducing required downward forces on a workpiece during friction stir welding, the apparatus comprising:
  a tool comprising:
    a casing;
    a pin for contacting said workpiece, the pin extending through the casing, and mounted for axial rotation with respect to the tool;
    a motor for rotating the pin;
  a resistive heating circuit for heating the pin and for creating a localized heated zone on said workpiece, the resistive heating circuit comprising:
    a power source;
    a positive junction connected to the casing; and
    a negative return junction defining the localized heated zone, wherein the negative return junction comprises:
      a first electrical contact positioned on said workpiece; and
      a second electrical contact positioned on said workpiece, wherein when the pin contacts said workpiece, the pin is substantially halfway between the first electrical contact and the second electrical contact, wherein the casing includes an upper shoulder and a lower shoulder for clamping the tool to said workpiece, wherein said upper shoulder is positioned on an upper surface of said workpiece and the lower shoulder is positioned on a lower surface of said workpiece, and wherein the pin extends through the upper shoulder, the lower shoulder, and said workpiece, the electrically assisted friction stir welding apparatus further comprising an insulation surrounding the pin electrically insulating the pin from the remainder of the apparatus, so that the flow of current through the pin is isolated from the flow of current through the casing.

9. An electrically assisted friction stir welding arrangement for reducing the required downward forces on a workpiece, the arrangement comprising:
  a workpiece;
  a vertically adjustable tool having a rotatable pin having a top portion and a bottom portion for contacting the workpiece
  a workpiece table supporting the workpiece below the pin when the pin contacts the workpiece;
  a resistive heating circuit for heating the rotatable pin and for creating a localized heated zone on the workpiece, the resistive heating circuit comprising:
    a power source;
    a positive junction connected to the top portion of the pin;
    a negative return junction defining the localized heated zone, the negative return junction comprising;
      a first electrical contact comprising a first elongated plate positioned on the workpiece; and
      a second electrical contact comprising a second elongated plate positioned on the workpiece, wherein when the pin contacts the workpiece, the pin is substantially halfway between the first contact and the second contact.

10. The arrangement of claim 9, wherein the workpiece table is mounted to be displaceable with respect to the pin in a working horizontal direction, and the first elongated plate and the second elongated plate are positioned on the workpiece to form a channel within which the pin is displaceable in said working horizontal direction, wherein the channel substantially defines the localized heated zone.

11. The arrangement of claim 10, further comprising:
  a first clamping device and a second clamping device holding the workpiece and the first and second elongated plates on the workpiece table; and
  an insulating arrangement, the insulating arrangement comprising:
    a first insulation pad sandwiched between the first elongated plate and the first clamping device;
    a second insulation pad sandwiched between the second elongated plate and the second clamping device; and
    a third insulation pad sandwiched between the workpiece table and said workpiece.

12. The arrangement of claim 11, wherein the pin comprises Molybdenum, and the workpiece comprises one of aluminum or steel, wherein each of the first elongated plate and the second elongated plate comprise copper, wherein the channel has a width of about 2 inches to about 0.5 inches.

13. The arrangement of claim 12, wherein the pin comprises a collar and a two-part tip, the two-part tip comprising:
  a first part having a first diameter; and
  a second part for initially contacting said workpiece, the second part having a second diameter, wherein the second diameter is about 25% to about 75% of the first diameter, wherein the collar has a diameter of the collar is larger than each of the first part and the second part.

14. An electrically assisted friction stir welding arrangement for reducing the required downward forces on a workpiece, the arrangement comprising:
  a workpiece;
  a vertically adjustable tool having a rotatable pin having a top portion and a bottom portion for contacting the workpiece a workpiece table supporting the workpiece below the pin when the pin contacts the workpiece;

a resistive heating circuit for heating the rotatable pin and for creating a localized heated zone on the workpiece, the resistive heating circuit comprising:

a power source;

a positive junction connected to the top portion of the pin;

a negative return junction defining the localized heated zone, the negative return junction comprising:

a first electrical contact positioned on the workpiece; and a second electrical contact positioned on the workpiece, wherein when the pin contacts the workpiece, the pin is substantially halfway between the first contact and the second contact, wherein the tool is portable and entirely movable by a user, the tool further comprising a casing through which the top portion of the pin extends and wherein the casing includes a lower shoulder, the arrangement further comprising:

a cylindrical spring attached to the lower shoulder of the casing, the cylindrical spring arrangement surrounding the bottom portion of the pin, the cylindrical spring further comprising a first slidable end and a second slidable end, wherein the first slidable end is the first electrical contact of the negative return junction and the second slidable end is the second electrical contact of the negative return junction.

15. The apparatus of claim 14, wherein the distance between the first slidable end and the second slidable end is about 1.0 in to about 2.0 in, and wherein the pin comprises Molybdenum, and the workpiece comprises one of aluminum or steel.

16. An electrically assisted friction stir welding method for reducing vertical force requirements, the method comprising:

providing a friction stir welding tool having a rotatable pin;

providing a workpiece;

providing a resistive heating circuit having an independent power source attached to the rotatable pin of the friction stir welding tool at a first positive junction, and the power source attached to the workpiece at a second negative junction, wherein the second negative junction includes first and second electrical contacts on the workpiece;

creating a localized heated zone on the workpiece by switching on the independent power supply and by moving the rotatable pin into contact with the workpiece, wherein the localized heated zone is substantially between the first and second electrical contacts;

rotating the rotatable pin; and advancing the rotating pin across the surface of the workpiece to weld the workpiece.

17. The electrically assisted friction stir welding method of claim 16, wherein when the rotatable pin contacts the workpiece, the pin is substantially halfway between the first electrical contact and the second electrical contact.

18. The electrically assisted friction stir welding method of claim 17, wherein the first electrical contact comprises a first elongated plate, and the second electrical contact comprises a second elongated plate, the first elongated plate and the second elongated plate positioned adjacent to each other in a substantially parallel relationship on the workpiece to form a channel, and wherein in the advancing of the rotating pin across the surface of the workpiece, the pin is moved within the channel, in a manner so that regardless of the location of the pin on the workpiece, the pin is maintained at a distance substantially halfway between the first elongated plate and the second elongated plate.

19. The electrically assisted friction stir welding method of claim 17, wherein the friction stir welding tool is portable and entirely movable by a user, the tool further comprising a casing through which the rotatable pin extends and wherein the casing includes a lower shoulder, and a cylindrical spring attached to the lower shoulder of the casing, the cylindrical spring arrangement surrounding the bottom portion of the rotatable pin, the cylindrical spring further comprising a first slidable end and a second slidable end, wherein the first slidable end is the first electrical contact of the negative return junction and the second slidable end is the second electrical contact of the negative return junction, wherein in the advancing the rotating pin across the surface of the workpiece, each of the first slidable end and the second slidable end maintains contact with the workpiece.

* * * * *